United States Patent [19]

Mosby et al.

[11] Patent Number: 4,656,927
[45] Date of Patent: Apr. 14, 1987

[54] DEVICE FOR MAKING DESIGNS ON TOAST

[76] Inventors: Bob L. Mosby; Edith C. Mosby, both of 11923 Coral Reef Dr., Houston, Tex. 77044

[21] Appl. No.: 806,520

[22] Filed: Dec. 9, 1985

[51] Int. Cl.$^4$ ............................................. A47J 37/08
[52] U.S. Cl. ...................................... 99/388; 99/339; 99/391; 99/402
[58] Field of Search ................. 99/388, 402, 339, 391, 99/379, 426

[56] References Cited

U.S. PATENT DOCUMENTS

| | | | |
|---|---|---|---|
| 1,892,117 | 12/1932 | Perkins | 99/388 |
| 2,160,771 | 5/1939 | Wertzheiser | 99/388 |
| 2,483,669 | 10/1949 | Reid | 99/388 X |
| 4,290,349 | 9/1981 | Fiorenza | 99/388 |

Primary Examiner—Billy J. Wilhite
Attorney, Agent, or Firm—Neal J. Mosely

[57] ABSTRACT

A device for producing designs on a slice of bread during toasting of the bread comprises a bread holding member removably received within the toast well of an electric toaster. The bread holding member is of lightweight heat resistive material having a bottom portion resting on the bread carriage member of the toaster and side panels which receive and carry a slice of bread to be toasted. Either or both of the side panels has a template cut out defining a framed central opening with a design therein. The design shields the bread slice from the heat of the toaster such that the design will be reproduced on the bread slice in toasting. An insulated handle provides for inserting and removing the bread holder from the toaster well and to protect the user from accidental burns or electrical shock. The bread holding member is isolated from direct contact with electrical conduit and heating elements of the toaster. A modification of the device includes removable side panels.

13 Claims, 7 Drawing Figures

DEVICE FOR MAKING DESIGNS ON TOAST

BACKGROUND OF THE INVENTION

1. Field of the Invention

This invention relates generally to toaster accessories, and more particularly to a device for making designs on toast.

2. Brief Description of the Prior Art

Toaster accessories are known in the art. There are several patents which disclose various toaster accessories for holding slices of bread to be toasted.

Fiorenza, U.S. Pat. No. 4,290,349 discloses a toaster accessory comprising a pair of hinged foraminous panels forming a holder for slices of bread. The hinge connection between the two panels is self adjusting and a locking device at the opposite end locks at different thicknesses to accept pre-made sandwiches to be toasted. Decorative inserts may be added to wire mesh or foraminous panels for making designs on the toasted sandwich. The panel material is not particularly suited to provide visibility of the design.

Bork, U.S. Pat. No. 3,046,870 discloses a toaster accessory comprising a pair of hinged frames of screen or mesh construction, each having an outwardly extending handle. A clasp member is pivotally mounted on one of the handles for latching the frames together. No provision is made for making ornamental designs on toast.

Ponte, U.S. Pat. No, 4,184,419 discloses a toaster accessory comprising a pair of hinged frames of wire construction, each having a handle of heat resistive material at its top. The device is designed to prevent burns and shocks while attempting to remove a piece of toast from a toaster slot, and does not suggest means for making ornamental designs on toast.

The present invention is distinguished from the prior art and these patents in particular by providing a device for producing designs on a slice of bread during toasting of the bread comprising comprises a bread holding member which is removably received within the toast well of a conventional electric toaster. The bread holding member is formed of lightweight heat resistive material having a bottom portion to be carried on the bread carriage member of the toaster and a pair of opposed side panels extending upwardly therefrom in a spaced parallel relation which receive and carry a slice of bread to be toasted.

At least one of the side panels has a template portion cut out which defines a framed central opening with a design disposed generally central within the framed opening. The design shields the face of the bread slice within the holder from the heat of the toaster such that the design will be reproduced on the bread slice after toasting. An insulated handle is provided in several forms for inserting and removing the bread holder from the toast well and to protect the user from accidental burns or electrical shock. The bread holding member is isolated from direct contact with electrical conduit and heating elements of the toaster. A modification of the device includes removable side panels.

SUMMARY OF THE INVENTION

It is therefore an object of the present invention to provide an improved device for producing various selected designs on a piece of toast.

It is another object of this invention is to provide a device for producing ornamental designs on toast which will prevent burns or shocks when inserting and removing a slice of toast from a toaster slot.

Another object of this invention is to provide a device for producing ornamental designs on toast which will eliminate wedging of the bread within a toaster slot and facilitate withdrawal of the toasted bread.

Another object of this invention is to provide a device for producing ornamental designs for the entertainment of children, and which may include letters or numbers for educational purposes.

A further object of this invention is to provide a device for producing toast which carries a distinctive logo or symbol of a commercial food establishment for the entertainment of consumers and for advertising purposes.

A still further object of this invention is to provide a device for producing ornamental designs on toast which is simple in construction and operation, safe and durable in use, and which may be manufactured economically.

Other objects of the invention will become apparent from time to time throughout the specification and claims as hereinafter related.

The above noted objects and other objects of the invention are accomplished by the present device for producing designs on a slice of bread during toasting of the bread comprising a bread holding member removably received within the toast well of a conventional electric toaster formed of lightweight heat resistive material having a bottom portion to be carried on the bread carriage member of the toaster and a pair of opposed side panels extending upwardly therefrom in a spaced parallel relation which receive and carry a slice of bread to be toasted.

At least one of the side panels has a template portion cut out which defines a framed central opening with a design disposed generally central within the framed opening. The design shields the face of the bread slice within the holder from the heat of the toaster such that the design will be reproduced on the bread slice after toasting. An insulated handle is provided in several forms for inserting and removing the bread holder from the toast well and to protect the user from accidental burns or electrical shock. The bread holding member is isolated from direct contact with electrical conduit and heating elements of the toaster. A modification of the device includes removable side panels.

DESCRIPTION OF THE PREFERRED EMBODIMENT

Figure 1:
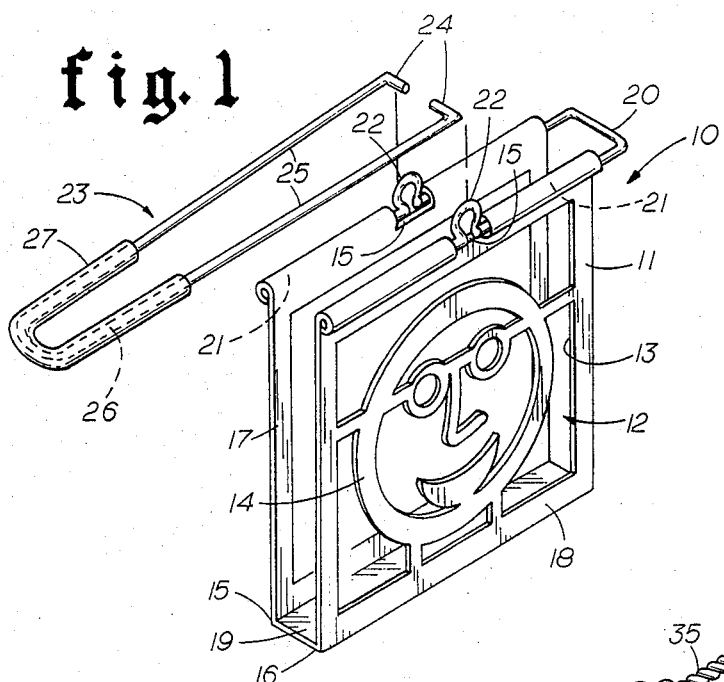
FIG. 1 is an isometric view of a device for producing designs on toast in accordance with the present invention.

Referring to the drawings by numerals of reference, and particularly to FIG. 1, there is shown a device for producing designs on toast 10. The device 10 comprises a frame or holder 11 adapted to fit into an opening or toast well of a standard toaster whereby a slice of bread carried by the holder may be toasted therein.

The holder 11 is formed of a rectangular sheet of lightweight, heat resistive, rigid material such as aluminum, stainless steel, or other suitable material. A template 12 is cut in the material at opposing ends in a manner to provide a framed substantially cut-out portion 13 having a design 14 disposed generally central within the cut-out portion. The remaining material surrounding the cut-out portion 13 forms a frame therearound. Each distal end of the rectangular sheet is notched or cut out to form opposing shallow slots 15. It should be understood that two different designs may be cut in the material, or that only a single design may be cut to produce a design only on one face of the toast. Also, the material may be cut such that one side of the holder is provided with an open frame so that one face of the bread will have a design and the other side will be completely browned or toasted.

The central portion of the rectangular sheet is bent transversely at two parallel spaced places 15 and 16 intermediate the templates 12 to form two opposed parallel spaced rectangular panels 17 and 18 joined at their bottom edges to a portion of the material forming a solid bottom surface 19. The size of the panels 17 and 18 should exceed that of a conventional slice of bread, and the spacing between the panels should be sufficient to accommodate a conventional thick slice of bread.

The top edges of the panels 17 and 18 are attached to a generally U-shaped reinforcing member 20 of heat resistive material such as aluminum or stainless steel wire or rod. The panels may be attached to the reinforcing member by welding, soldering, crimping, or by other suitable means and, in the illustrated embodiment the panels are rolled over the leg portions 21 of the reinforcing member 20. The leg portions 21 are each provided with a raised loop 22 which extends upwardly from the slots 15.

A handling tool 23 is provided for inserting and removing the holder 10 from the toaster. The tool 23 is formed of heat resistive resilient material such as stainless steel wire or rod bent into an elongate, generally U-shaped configuration, the distal ends 24 of which are bent inwardly and adapted to be received within the raised loops 22 when the leg portions 25 are squeezed together and expand outwardly therefrom when released. The central U-shaped portion 26 of the tool may be provided with a covering or handle 27 of thermal and electrical insulating material to protect the user from accidental burns or electrical shock as the holder is raised in and out of the toaster.

The user inserts a conventional slice of bread into the holder, grips the tool 23 by the handle 27, and squeezes the legs 25 of the tool so that the bent ends 24 are received within the loops 22. The holder 10 is placed into the toaster slot or toast well and the pressure is relaxed on the legs allowing the holder to be released. The weight of the holder and the bread slice moving down on the toaster bread carriage activates the heating element of the toaster in a conventional manner.

Figure 2:
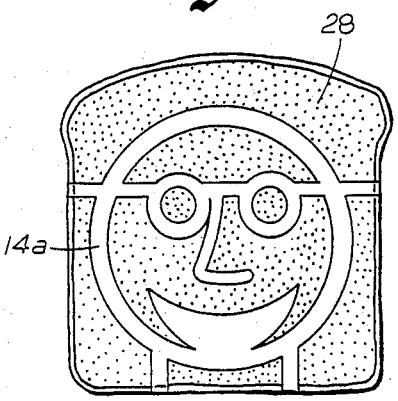
FIG. 2 is a front elevation view of a slice of toasted bread having a design created thereon by a device for producing designs on toast.

When the toasting cycle is completed, the holder 10 is automatically raised to extend a distance above the toaster slot or toast well. The user again grips the tool 23 by the handle 27, and squeezes the legs 25 of the tool so that the bent ends 24 are received within the loops 22 and removes the holder from the toast well of the toaster. Pressure is relaxed on the legs 25 allowing the holder 10 to be released and after the holder has cooled sufficiently, the finished toast is removed from the holder. As shown in FIG. 2, the ornamental design of the template 12 shields the face of the bread from the heat of the toaster so that the design 14a of the template will be reproduced on the toast 28.

Figure 3:
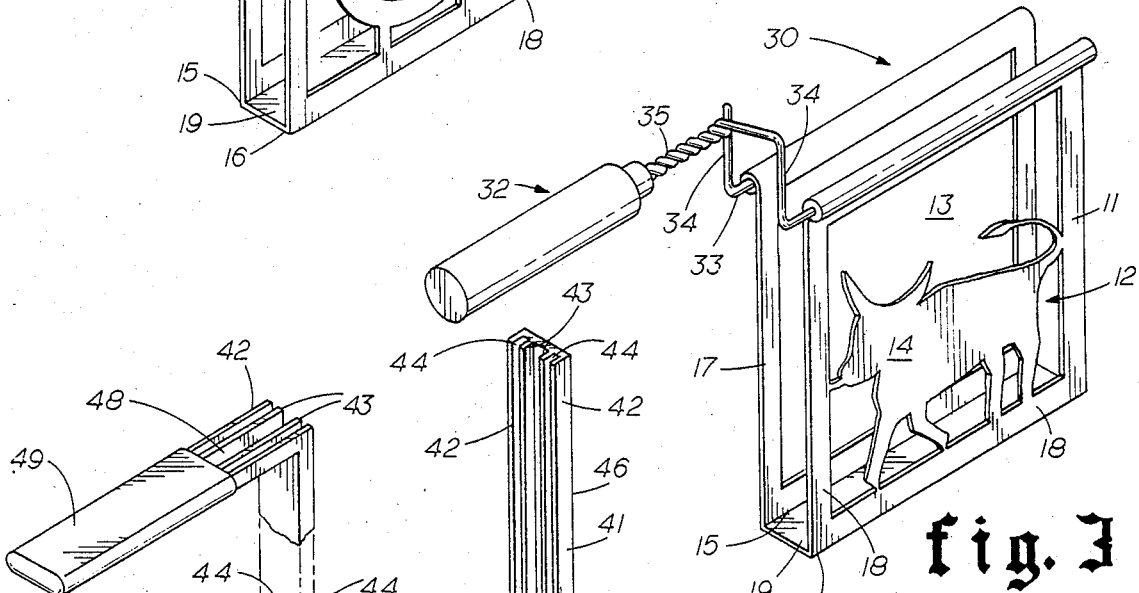
FIG. 3 is an isometric view of a device for producing designs on toast having an alternate handle configuration.

FIG. 3 shows a modified device for producing designs on toast 30 wherein the holder 31 has a handle member 32 permanently secured to the top edge of the panels 17 and 18. Identical numbers are used to designate identical parts previously described in the embodiment of FIG. 1, and to avoid repetition, their description will not be repeated here.

The handle member 32 is formed of heat resistive resilient material such as stainless steel wire or rod fashioned to form a pair of elongate straight parallel legs 33, having a portion 34 bent perpendicularly upwardly to allow clearance when moving the device in and out of the toaster slot and then rebent to extend from the perpendicular portion and twisted together as indicated at 35. The twisted portion 35 of the wire or rod may be provided with a covering or handle 36 of thermal and electrical insulating material to protect the user from accidental burns or electrical shock as the holder is raised in and out of the toaster. It should be understood that the handle member is shaped and sufficiently light weight so as to not interfere with the normal operating mechanisms of the conventional toaster.

The top edge of the panels 17 and 18 may be attached to the parallel legs 33 by welding, soldering, crimping, or by other suitable means and, in the illustrated embodiment the top edge of the panels are rolled over the leg portions of the wire or rod.

The holder 30 is placed into the toast well through the slot at the top of the toaster and released. The weight of the holder and the bread slice moving down on the bread carriage member of the toaster activates the heating elements of the toaster in a conventional manner. When the toasting cycle is completed, the holder is automatically raised to extend a distance above the toaster slot. The user grips the holder 30 by the handle 32, and removes it from the toaster. The finished toast is removed from the holder. As shown in FIG. 2, the ornamental design 14 shields the face of the bread from the heat of the toaster so that on the finished toast the design 14a of the template will be reproduced on the toast.

Figure 4:
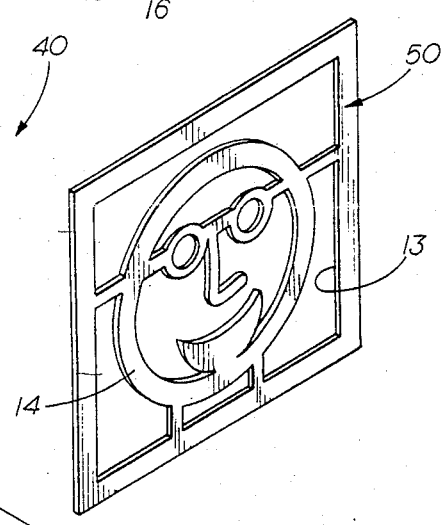
FIG. 4 is an exploded isometric view of a device for producing designs on toast having removable template inserts.
Figure 5:
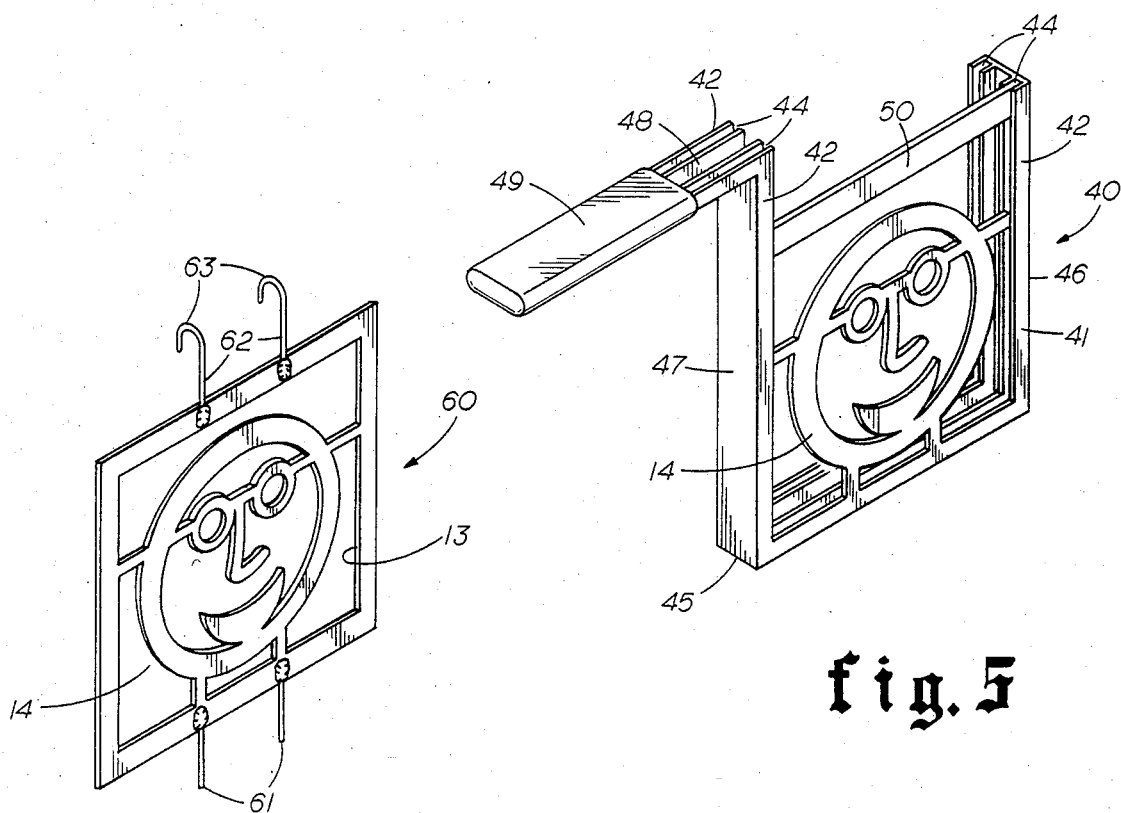
FIG. 5 is an isometric view of the device of FIG. 1 in the assembled condition.

FIGS. 4 and 5 show another modified device for producing designs on toast 40 wherein the panels are removable from a frame member 41 having an integral handle portion. The frame member 41 is formed from a strip of heat resistive channel material such as aluminum or stainless steel having raised side edges 42 and raised ribs 43 spaced closely parallel inward of each side edge to form a pair of longitudinal slots 44 along each side edge. The channel strip is bent into a generally U-shape having a straight bottom portion 45, two opposed upright legs 46 and 47 bent perpendicular thereto, and a handle portion 48 bent to extend perpendicularly outward from the top of one leg 47. After bending, the slots 44 of the bottom portion and legs are in alignment on the outer peripheral edge of the frame.

The size and shape of the frame member 41 is sufficient to be received in the toast well of a conventional electric toaster. The spacing of the ribs 43 is such that a conventional slice of thick bread may be received vertically therebetween. The handle portion 48 is located to allow clearance when moving the frame 41 in and out of the toaster slot. The handle portion 48 may be provided with a covering or handle 49 of thermal and electrical insulating material to protect the user from accidental burns or electrical shock as the frame is raised in and out of the toaster. It should be understood that the frame member is shaped and sufficiently light weight so as to not interfere with the normal operating mechanisms of the conventional toaster.

One or more template panels 50 are cut from a sheet of lightweight, heat resistive, rigid material such as aluminum, stainless steel, or other suitable material. Identical numbers are used to designate identical parts previously described in the embodiment of FIG. 1. Each template panel 50 is die cut in a manner to provide a framed substantial cutout portion 13 having a design 14 disposed generally central within the cut out portion and the remaining material surrounding the cut out portion forms a frame therearound. The size of the template panels 50 should exceed that of a conventional slice of bread.

A pair of template panels 50 are inserted into the open top of the U-shaped frame member and slidably received in the aligned peripheral slots 44 as shown in FIG. 5. Only one panel is illustrated in the slots for clarity.

The frame 41 is placed into the toast well through the toaster slot and released. The weight of the frame and the bread slice moving down activates the heating elements of the toaster in a conventional manner. When the toasting cycle is completed, the frame is automatically raised to extend a distance above the toaster slot. The user grips the frame by the handle, and removes it from the toaster. The finished toast is removed from the frame. As shown in FIG. 2, the ornamental design of the template panel shields the face of the bread from the heat of the toaster so that on the finished toast the design 14a of the panel will be reproduced on the toast.

The embodiment of FIGS. 4 and 5 allow the user to use a variety of different designs by interchanging the template panels. The panels may be sold in sets, and purchased separately of the frame.

Figure 6:
FIG. 6 is an isometric view of a device for producing designs on toast adapted to be installed in a conventional electric toaster.
Figure 7:
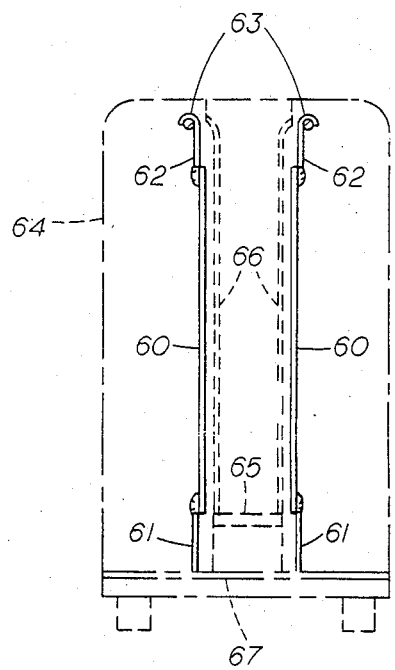
FIG. 7 is an end view of the device of FIG. 6 installed within a conventional toaster with the toaster indicated by dotted line.

FIGS. 6 and 7 show another modified device for producing designs on toast wherein a set of template panels 60 are removably installed inside a conventional electric toaster replacing the existing wire bread guides. Identical numbers are used to designate identical parts previously described in the embodiment of FIG. 1. For purposes of illustration and clarity of understanding, the wire bread guides 66 are shown in dotted line in FIG. 7, and it should be understood they are actually removed when the panels 60 are installed. The dotted line illustrates their approximate position before removal.

One or more template panels 60 are cut from a sheet of lightweight, heat resistive, rigid material such as aluminum, stainless steel, or other suitable material. Each template panel 60 is die cut in a manner to provide a framed substantial cut out portion 13 having a design 14 disposed generally centrally within the cut out portion and the remaining material surrounding the cut out portion forms a frame therearound. The size of the template panels 60 should exceed that of a conventional slice of bread.

A pair of spaced parallel straight legs 61 of heat resistive material such as stainless steel wire or rod are attached to the bottom of each template panel 60 to depend downwardly therefrom. A pair of spaced parallel hook members 62 of the same material are attached to the top of each template plate 60 to extend upwardly a distance therefrom. The extended ends of the hook members 62 are rebent to form an inverted U-shaped hook 63. The legs 61 and hook members 62 may be attached to the template panels 60 by welding, soldering, crimping, or by other suitable means and, in the illustrated embodiment the legs and hook members are soldered to the panels. The size and shape of the template panels 60 are sufficient to be installed in the toast well of a conventional electric toaster after removal of the wire bread guides 66 and are shaped so as to not interfere with the normal operating mechanisms of the conventional toaster.

With the conventional toaster 64 unplugged, the cover housing is carefully removed and the existing wire bread guides are removed. The desired template panel or panels 60 are selected and placed at one or both sides of the existing toaster bread carriage member 65 where the wire bread guides 66 were previously supported. The hooks 63 are received on an existing wire bread guide upper support member at the top of the toaster and the legs 61 are supported on a bread guide lower support member adjacent the bottom plate 67 or crumb tray of the toaster. It is extremely important that the hooks and legs and surface of the template panel not be in contact with the bread carriage or any of the electrical conduit or heating elements of the toaster. The cover is replaced and secured and the toaster is plugged in.

A slice or slices of bread are placed into the toaster slot and released. The weight of the bread slice moving down on the bread carriage activates the heating elements of the toaster in a conventional manner. When the toasting cycle is completed, the toasted bread is automatically raised by the bread carriage to extend a distance above the toaster slot for easy removal. As shown in FIG. 2, the ornamental design of the template panel 60 shields the face of the bread from the heat of the toaster so that on the finished toast the design of the template panel is reproduced on the toast.

The embodiment of FIGS. 6 and 7 is particularly suitable for commercial usage and once installed, allow the user to make toast in a conventional manner. The novel finished toast may carry the logo of a commercial establishment.

OPERATION

To use the device illustrated in FIG. 1, the user inserts a slice of bread into the holder, grips the handling tool 23 by the handle 27, and squeezes the legs of the tool so that the bent ends 24 are received within the loops 22. The holder is placed into the toast well through the slot at the top of the housing and the pressure is relaxed on the legs allowing the holder to be released. The weight of the holder and the bread slice moving down on the toaster bread carriage activates the heating elements of the toaster in a conventional manner.

When the toasting cycle is completed, the holder is automatically raised by the bread carriage to extend a distance above the toaster slot. The user again grips the handling tool by the handle, and squeezes the legs of the tool so that the bent ends are received within the loops and removes the holder from the toaster. Pressure is relaxed on the legs allowing the holder to be released and after the holder has cooled sufficiently, the finished toast is removed from the holder. As shown in FIG. 2, the ornamental design of the side panel shields the face of the bread from the heat of the toaster so that on the finished toast the design of the template will be reproduced on the toast.

To use the device illustrated in FIG. 3, a slice of bread is simply placed into the holder through the open top and the holder is placed into the toast well through the slot in the top of the toaster housing and released. The weight of the holder and the bread slice moving down on the bread carriage member of the toaster activates the heating elements of the toaster in a conventional manner. When the toasting cycle is completed, the holder is automatically raised by the bread carriage member to extend a distance above the toaster slot. The user grips the holder by the handle, and removes it from the toaster. The finished toast is removed from the holder after cooling. As described, the design of the side panel will be reproduced on the toast.

To use the device illustrated in FIG. 4, a pair of template panels 50 are selected and inserted into the open top of the U-shaped frame member and slidably received in the aligned slots 44 as shown in FIG. 5. The frame is placed into the bread well and released and the steps as previously described in reference to FIG. 3 are followed.

The embodiment of FIGS. 6 and 7 is particularly suitable for commercial usage. With the panels installed as previously described, the user simply inserts the toast into the toaster in and makes the toast in the conventional manner. The novel finished toast will carry the logo or symbol of the commercial establishment.

While this invention has been described fully and completely with special emphasis upon several embodiments, it should be understood that within the scope of the appended claims the invention may be practiced otherwise than as specifically described herein.

We claim:

1. A device for producing designs on a slice of bread during toasting of the bread in an electric toaster having a toast well and a bread carriage member comprising;

a bread holding member of lightweight heat resistive material adapted to receive and removably carry a slice of bread into the toast well of an electric toaster and isolated from direct contact with any electrical conduit or heating elements of the toaster, said bread holding member having a bottom portion to rest on the bread carriage member of the electric toaster and side panels extending upwardly therefrom in a spaced parallel relation and a top portion thereof adapted to receive a handling member, at least one of said side panels having a template portion comprising a frame central opening therethrough and a design disposed generally central within the framed opening, and a handling member of heat resistive material operatively associated with said holding member for inserting and removing said bread holder from the toast well of an electric toaster, said design of said template portion shielding the face of the bread carried within said bread holding member such that the design will be reproduced on the slice of bread in toasting.

2. The device according to claim 1 wherein
a portion of said handling member has a covering of thermal and electrical insulating material to protect the user from burns or electrical shock during use in the toaster.

3. The device according to claim 1 wherein
said bread holding member and said side panels comprise a generally U-shaped configuration formed from a single rectangular sheet of lightweight, heat resistive, rigid material, the central portion of which is bent transversely at two parallel places to form the bottom portion and the parallel spaced side panels extending upwardly therefrom.

4. The device according to claim 1 wherein
the top portion of said bread holding member is adapted to receive said handling member, and
said handling member is adapted to be releasably received in the top portion of said bread holding member.

5. The device according to claim 4 wherein
a top portion of each side panel of said bread holding member is secured to a rod member of heat resistive material having a raised loop extending centrally above said panel to releasably receive said handling member, and
said handling member comprises a resilient rod of elongate, generally U-shaped configuration, the distal ends of which are bent inwardly and adapted to be received within said raised loops when the leg portions of the handling member are squeezed together and expand outwardly therefrom when released.

6. The device according to claim 1 wherein
said handling member is provided with a handle portion of thermal and electrical insulating material and a pair of elongate straight parallel legs extending outwardly therefrom, and
a top portion of each side panel of said bread holding member is secured to the parallel legs of said handling member.

7. The device according to claim 6 wherein
said handling member comprises a rod bent to form a twisted handle portion at one end, a pair of elongate straight parallel spaced legs at the opposed end, and a short upwardly extending portion therebetween normal to the straight legs sufficient to allow clearance when moving the bread holding member in and out of the toaster bread well,
said twisted handle portion having a covering of thermal and electrical insulating material to protect the user from burns or electrical shock as the bread holding member is raised in and out of the toaster bread well.

8. A device according to claim 1 wherein
said bread holding member comprises a frame member,
said handling member is integral with said frame and extends outwardly therefrom, and
said side panels comprise a flat plate removably received within said frame member.

9. A device according to claim 8 wherein
said frame member is comprises a strip of channel material having a slot extending around the periphery of side edges thereof and bent into a generally U-shaped configuration with a straight bottom portion, two opposed upright legs bent normal thereto, and said handling member bent to extend perpendicularly outward from the top of one said leg at a location sufficient to provide clearance between the toaster bread well when moving said frame in and out of said well, a portion of said handling member provided with a covering of thermal and electrical insulating material to protect the user from burns or electrical shock as the frame is raised in and out of the toaster, and at least one panel being adapted to be slidably and removably received within said peripheral slot and of a size exceeding the size of the slice of bread to be toasted.

10. A device for producing designs on a slice of bread during toasting of the bread in an electric toaster having a toast well and a bread carriage member comprising;

at least one flat rectangular planar panel of lightweight heat resistive material adapted to be removably received within the toast well of an electric toaster and isolated from direct contact with any movable members or any electrical conduit or heating elements of the toaster, said panel having a template portion comprising a framed central opening therethrough and a design disposed generally central within the framed opening, and said template design shielding the bread carried within said holder member from the heat of the toaster such that the design will be reproduced on the slice of bread after toasting.

11. A device according to claim 10 wherein said rectangular panel having lower support means attached to a bottom portion thereof and upper support means attached to a top portion thereof for supporting said panel within the toast well of an electric toaster, said lower support means resting on structural members of the toaster at the bottom portion thereof and said upper support means resting on structural members of the toaster at the side of the toast well.

12. A device according to claim 11 wherein said lower support means comprises a pair of spaced parallel legs of heat resistive material attached to the bottom portion of said panel to depend downwardly therefrom, and said upper support means comprises a pair of spaced parallel hook members of heat resistive material attached to the top portion of said panel to extend upwardly a distance therefrom.

13. A device for producing designs on a slice of bread during toasting of the bread in an electric toaster having a toast well and a bread carriage member comprising;

a pair of stencils of lightweight heat resistive sheet material supported in spaced relation with a supporting portion extending therebetween to receive and removably carry a slice of bread into the toast well of an electric toaster and isolated from direct contact with any electrical conduit or heating elements of the toaster, said supporting portion being adapted to rest on the bread carriage member of the electric toaster, and a handling member of heat resistive material operatively associated with said stencils for inserting and removing said device from the toast well of the toaster, said stencils shielding the face of the bread carried therebetween to produce a design on the slice of bread carried therebetween in toasting.

* * * * *